Patented Oct. 7, 1930

1,777,931

UNITED STATES PATENT OFFICE

WILHELM NEELMEIER, OF LEVERKUSEN, AND THEODOR NOCKEN, OF WIESDORF, GERMANY, ASSIGNORS TO GENERAL ANILINE WORKS, INC., OF NEW YORK, N. Y., A CORPORATION OF DELAWARE

3-ARYLAMINO-1-8-NAPHTHSULTAM COMPOUND AND PROCESS OF MAKING THE SAME

No Drawing. Application filed July 21, 1926, Serial No. 124,091, and in Germany July 28, 1925.

Our invention consists in acting with an arylamine upon a 1-8-naphthsultam-3-sulfonic acid compound and in the novel 3-arylamino-1-8-naphthsultam compounds obtained.

By this reaction the sulfo group in 3 position is replaced by an arylamino group with liberation of sulfur dioxid. The reaction is effected by heating to elevated temperatures and preferably in presence of a salt of the arylamine. The degree of heating and other particular reaction conditions are of course to a certain extent dependent upon the specific arylamine and naphthsultam compound used. The reaction can also be carried out in presence of suitable solvents or diluents.

The arylamines of the benzene and naphthalene series are particularly suited for carrying out our invention.

In using the 1-8-naphthsultam-3-sulfonic acid itself 3-arylamino-naphthsultams are obtained and from the 1-8-naphthsultam-3-6-disulfonic acid 3-arylamino-1-8-naphthsultam-6-sulfonic acid can be produced. In using the 1-8-naphthsultam-3-(4?)-6-trisulfonic acid, in which the position of one of the sulfo groups is uncertain, as described in the Berichte der Deutschen Chemischen Gesellschaft, vol. 27, page 2149 (1894), 3-arylamino-1-8-naphthsultam-6-sulfonic acids are similarly obtained with elimination of the labile sulfo group.

Our novel 3-arylamino-1-8-naphthsultam compounds are of the general formula:

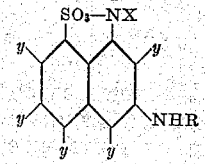

in which R is an aryl group which may be substituted, X represents hydrogen, alkyl, or acidyl, and $y$ represents hydrogen or a sulfonic acid group.

We found the 3-arylamino-1-8-naphthsultam-6-sulfonic acids of partciular interest as intermediates for the production of dyestuffs. They are of the general formula:

They form salts with organic and inorganic bases, which are of yellow color and usually well crystallized.

The sultam NH group can easily be acetylated or alkylated to form the coresponding 1-N-alkyl (or acyl)-3-arylamino-1-8-naphthsultam compound.

Some typical 3-arylamino-1-8-naphthsultam-6-sulfonic acid compounds are those produced by reacting with 1-8-naphthsultam-3-6-disulfonic acid upon aniline, the toluidines, p-anisidine, etc. The novel products obtained can be represented by the formulas:

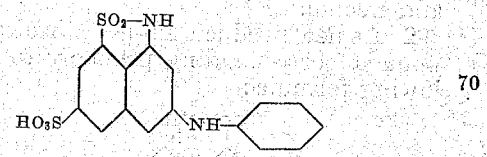

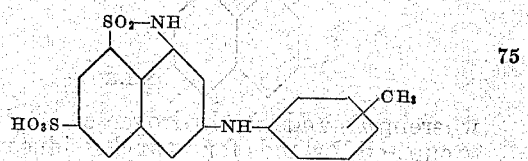

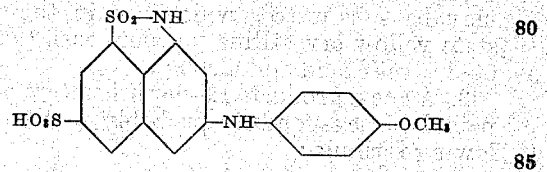

The following example will further illustrate our invention, the parts being by weight:

387 parts of the acid sodium salt of the 1-8-naphthsultam-3-6-disulfonic acid (described by Dressel and Kothe in Berichte der Deutschen Chemischen Gesellschaft, vol. 27, page 2149, 1894) are heated with 1200 parts aniline and 200 parts 19½° Bé. hydrochloric acid to 130–140° C. The reaction product is poured into a mixture of ice and excess hydrochloric acid. The aniline salt of the 3-phenylamino-1.8-naphthsultam - 6 - sulfonic acid separates and is filtered off. It can be purified by crystallization from very dilute acetic acid and is then obtained as small prisms, melting at 277–278° C. It is easily soluble in acetic acid and alcohol, and difficultly soluble in water.

Dilute caustic soda or sodium acetate solution decomposes the aniline salt; after removing the aniline from the solution and salting out, the crystallized sodium salt is obtained, which is a yellowish powder, easily soluble in water and alcohol. The barium salt is difficultly soluble, whereas the potassium salt, which crystallizes in yellow prisms is easily soluble and can be used for purifying the compound.

We claim:—

1. As new products 1.8-naphthsultam compounds, corresponding probably to the following formula:

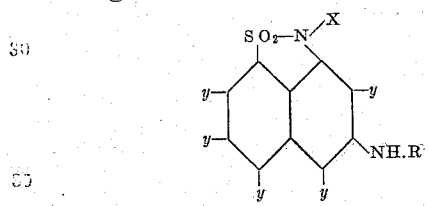

wherein X stands for hydrogen, alkyl, or acidyl, R for an aryl residue which may be substituted, $y$ for hydrogen or a sulfonic acid group, which are in the dry state, yellow crystalline powders easily soluble in acetic acid and alcohol.

2. As new products 1.8-naphthsultam compounds, corresponding probably to the following formula:

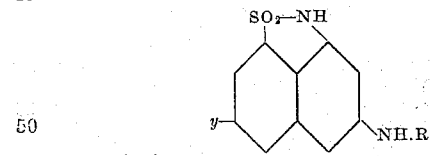

wherein $y$ stands for hydrogen or a sulfonic group and R stands for an aryl residue which may be substituted, which are in the dry state yellow crystalline powders easily soluble in acetic acid and alcohol.

3. As new products 1.8-naphthsultam compounds, corresponding probably to the following formula:

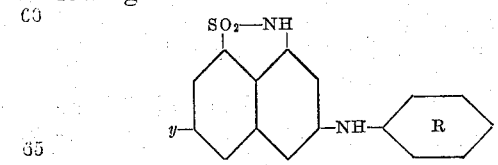

wherein $y$ stands for hydrogen or a sulfonic group and R may be substituted, which are in the dry state yellow crystalline powders easily soluble in acetic acid and alcohol.

4. As new products 1.8-naphthsultam compounds, corresponding probably to the following formula:

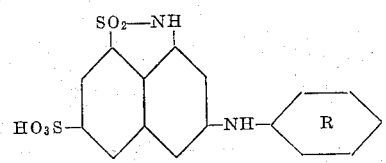

wherein R may be substituted, which are in the dry state yellow crystalline powders easily soluble in acetic acid and alcohol.

5. As a new product the 3-phenylamino-1.8-naphthsultam-6-sulfonic acid of the formula:

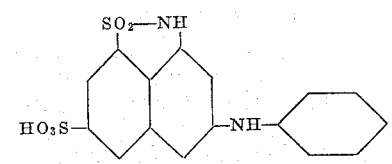

which forms an aniline salt crystallizing in small prisms melting at 277° to 278° C., easily soluble in acetic acid and alcohol, difficultly soluble in water, forming a difficultly soluble barium salt, and a potassium salt crystallizing in yellow, easily soluble prisms.

6. A process of making 3-arylamino-1.8-naphthsultam-6-sulfonic acids which comprises reacting upon a 1.8-naphthsultam-3.6-disulfonic acid with a primary aromatic amine.

7. A process of making 3-arylamino-1.8-naphthsultam-6-sulfonic acids which comprises reacting upon a 1.8-naphthsultam-3.6-disulfonic acid with a primary aromatic amine in the presence of a salt of said amine.

8. A process of making 3-phenylamino-1.8-naphthsultam-6-sulfonic acid which comprises reacting upon aniline with 1.8-naphthsultam-3.6-disulfonic acid in the presence of hydrochloric acid at a temperature of about 130–140° C.

9. A process of making 3-arylamino-1.8-naphthsultam compounds which comprises reacting with a primary aromatic amine upon a 1.8-naphthsultam-3-sulfonic acid compound, which may be substituted by further sulfonic acid groups.

10. A process of making 3-arylamino-1.8-naphthsultam compounds which comprises reacting upon a 1.8-naphthsultam-3-sulfonic acid compound, which may be substituted by further sulfonic acid groups, with a primary aromatic amine in the presence of a salt of the said amine.

In testimony whereof, we affix our signatures.

WILHELM NEELMEIER.
THEODOR NOCKEN.